Figure 7:
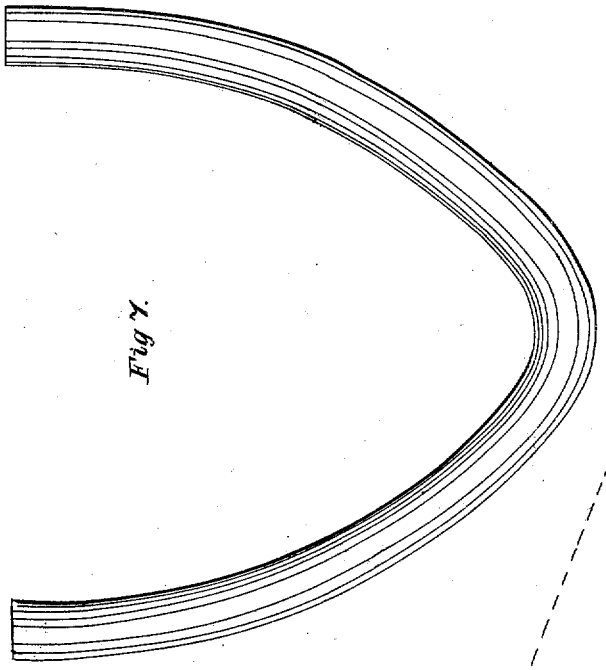
Figure 8:
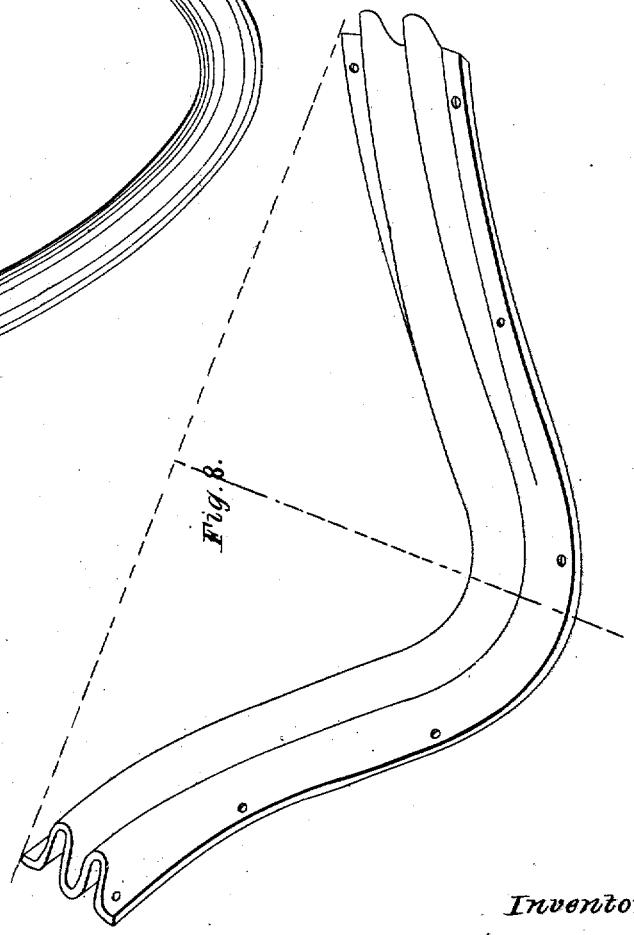

Sheet 1, 3 Sheets.
R. Montgomery.
Armor Clad.
No. 2,244. Reissued May 15, 1866
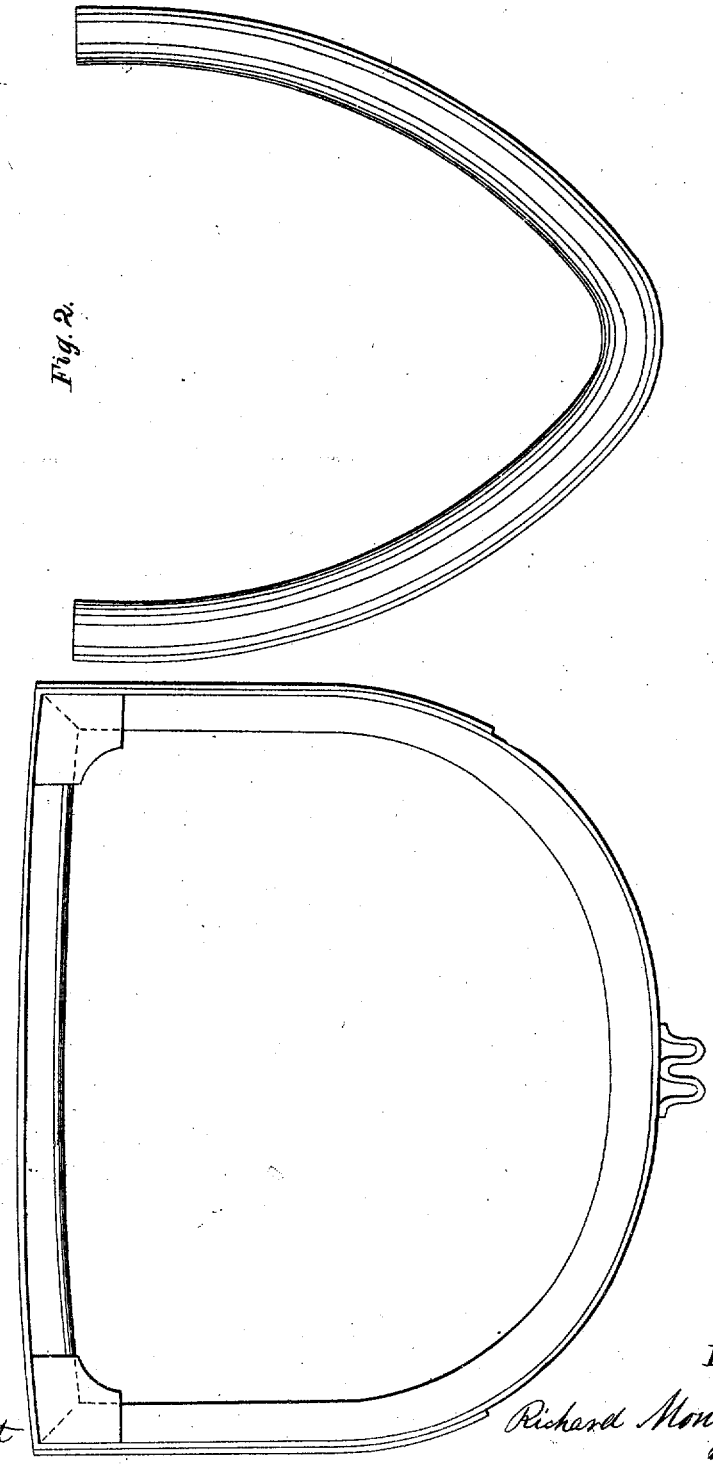
Witnesses.
H. King
Thos Naylor
Inventor.
Richard Montgomery
N. PETERS, PHOTO-LITHOGRAPHER, WASHINGTON, D. C.

Sheet 2, 3 Sheets.
R. Montgomery.
Armor Clad.
No. 2,244. Reissued May 15, 1866.
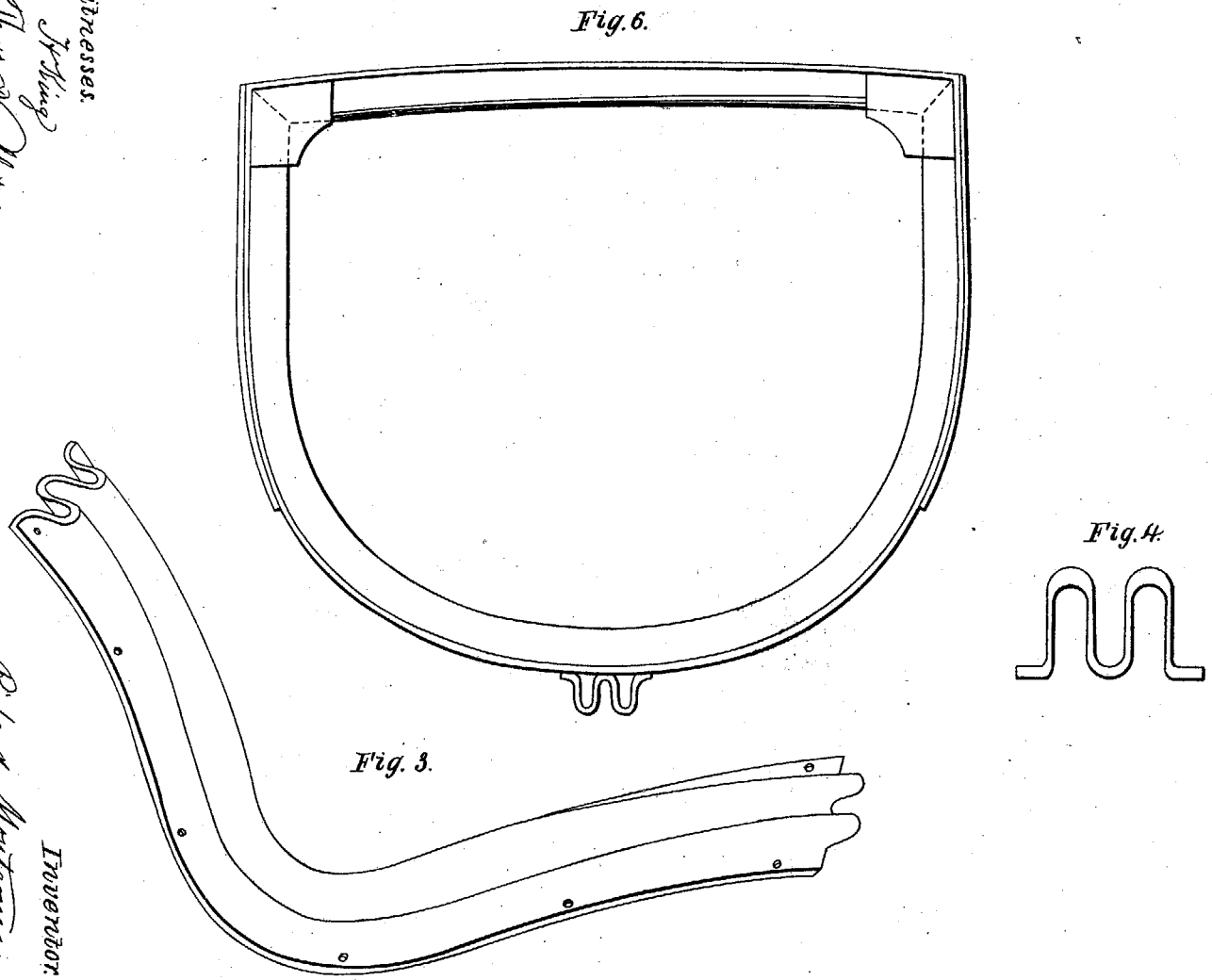
Witnesses.
J. King
Thos Waupht
Inventor.
Richard Montgomery
N. PETERS, PHOTO-LITHOGRAPHER, WASHINGTON, D. C.

Sheet 3, 3 Sheets.

R. Montgomery.

Armor Clad.

No. 2,244. Reissued May 15, 1866.

Witnesses.

J. King

Thos Waufhut

Inventor.

Richard Montgomery

N. PETERS, PHOTO-LITHOGRAPHER, WASHINGTON, D. C.

UNITED STATES PATENT OFFICE.

RICHARD MONTGOMERY, OF NEW YORK, N. Y., ASSIGNOR, BY MESNE ASSIGNMENTS, TO MARY JANE MONTGOMERY.

IMPROVEMENT IN IRON SHIPS.

Specification forming part of Letters Patent No. 26,367, dated December 6, 1859; Reissue No. 2,244, dated May 15, 1866.

*To all whom it may concern:*

Be it known that I, RICHARD MONTGOMERY, of the city, county, and State of New York, did invent certain new and useful Improvements in the Mode of Constructing Iron, for which Letters Patent of the United States were granted me, bearing date the 6th day of December, 1859, which Letters Patent, by reason of an insufficient and defective specification, are inoperative and invalid, and which error arose from inadvertence, accident, or mistake, without any fraudulent or deceptive intention; therefore, in virtue and by authority of the laws of the United States for such cases made and provided, I do hereby surrender the said patent for the purpose of reissuing as two distinct patents.

The following, which relates to the curved, sheared, and bent corrugated beam, which I had to invent before being able to construct the said iron ship, I make the second division of the reissue.

Previous to this invention the straight corrugated beam was well known and highly appreciated for its quality of great rigidity in proportion to the amount of material used, but it could only be applied where a straight beam could be used. Anxious to avail myself of these qualities, particularly in the construction of ships, I devised several plans, all of which were successful. The great question to be decided was to give these bars any curve or shear required without what is called "crinkling" the bar, or deranging the relative positions of the corrugations to each other, as these are essential elements in retaining the original rigidity in all the parts of the bar or beam. One of the successful plans adopted was running melted lead, or other metal or metallic compound, into the corrugation and around the beam at the part where the curve, bend, or shear was to be made, and by the application of the force required to give the form desired. Another was to insert iron bars previously prepared of the required form into the grooves of the corrugation at some particular part, and bend the beam upon them. Subsequently, however, I invented a machine for which a patent has been granted me, which greatly facilitates and expedites the operation.

In the drawings hereto attached, Figure 1 shows the form of a ship's rib about mid-ship. Fig. 2, one near the bow; and Fig. 3, one near the stern; and Fig. 4, a cross-section of the beam itself.

As this is capable of being applied to many other purposes than ship-building, and thus, like the straight beam, become an independent article of trade; therefore

I claim—

The above-described curved, bent, or sheared corrugated beam, irrespective of any peculiar curve, bend, or shear, in the construction of ships or other vessels.

RICHARD MONTGOMERY.

Witnesses:
H. KING,
EDM. F. BROWN.